United States Patent [19]

Maiden

[11] Patent Number: 5,580,365
[45] Date of Patent: Dec. 3, 1996

[54] METHOD OF MAKING A GLASS DIFFUSION CELL

[76] Inventor: Robert P. Maiden, 13564 E. Imperial Hwy.-Unit E, Santa Fe Springs, Calif. 90670

[21] Appl. No.: 344,979

[22] Filed: Nov. 25, 1994

[51] Int. Cl.$^6$ ............................ C03B 23/04; C03B 23/207
[52] U.S. Cl. .................. 65/104; 65/105; 65/108; 65/109; 65/153
[58] Field of Search ........................ 65/102, 108, 109, 65/110, 114, 113, 117, 120, 105, 153; 428/34.4; 73/64.47; 264/503; 165/154, 217, 223; 422/99, 101, 102

[56] References Cited

U.S. PATENT DOCUMENTS

| | | | |
|---|---|---|---|
| 1,906,315 | 5/1933 | Davis et al. | 65/109 |
| 1,968,263 | 7/1934 | Reuther | 65/153 |
| 2,076,903 | 4/1937 | Levitt | 422/101 |
| 4,594,884 | 6/1986 | Bondi et al. | 73/64.47 |
| 5,198,109 | 3/1993 | Hanson et al. | 73/64.47 |
| 5,296,139 | 3/1994 | Hanson et al. | 73/64.47 |

FOREIGN PATENT DOCUMENTS

| | | | |
|---|---|---|---|
| 390832 | 11/1973 | U.S.S.R. | 65/109 |
| 1457501 | 12/1976 | United Kingdom | 65/109 |

*Primary Examiner*—William Beisner
*Attorney, Agent, or Firm*—Jack C. Munro

[57] ABSTRACT

The method of making a glass diffusion cell which utilizes taking of an inner glass tube and forming an enlarged annular flange at one end of this tube and in the sidewall of this tube forming a refilling port and a sampling port. This inner glass tube is then located within an outer glass tube with the end of this outer glass tube that is located directly adjacent the enlarged annular flange being sealed to the inner glass tube. The sidewall of the outer glass tube is then spot heated which permits a refilling tube to be connected to the refilling port and a sampling tube to be connected to the sampling port establishing a fluid interconnection with the interior of the inner glass tube. Inlet and outlet tubes are connected to the sidewall of the outer glass tube which fluidly connect with the annular chamber located between the inner glass tube and the outer glass tube. The bottom wall of both the inner glass tube and the outer glass tube are then sealed.

5 Claims, 6 Drawing Sheets

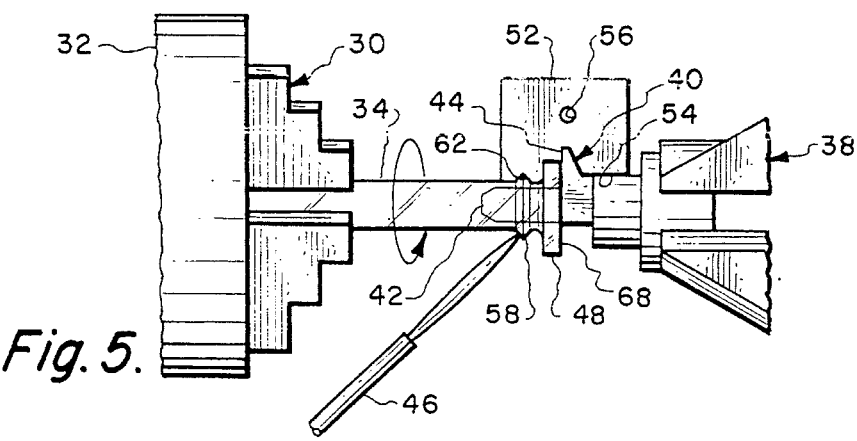
Fig. 5.
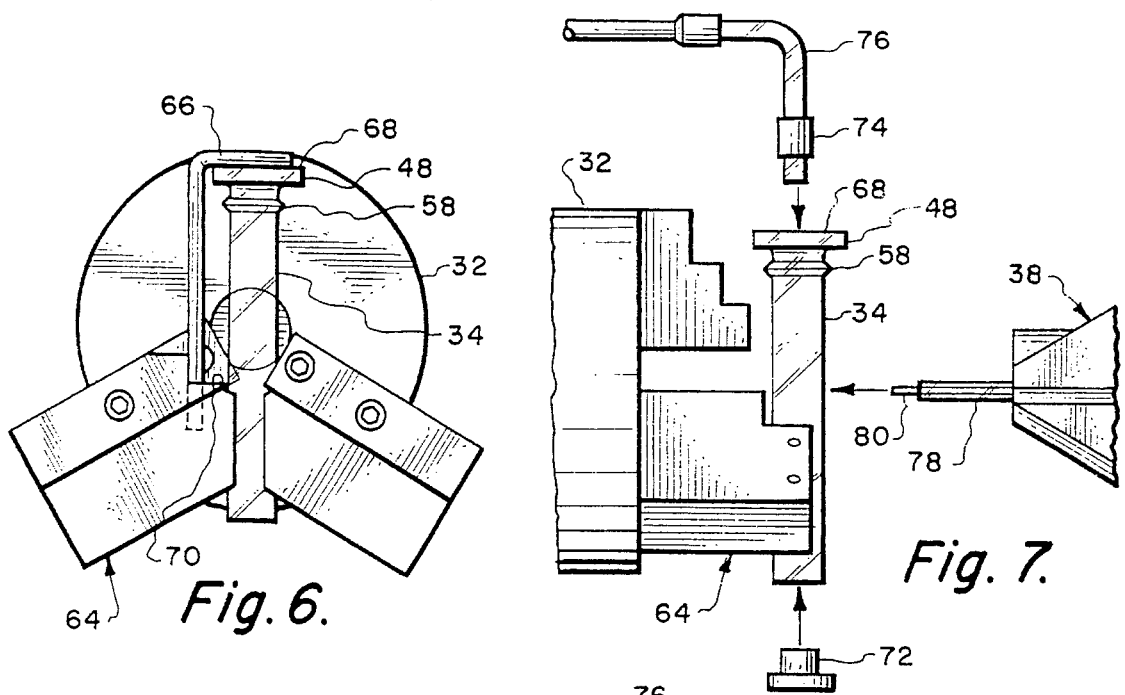
Fig. 6.　Fig. 7.
Fig. 8.

METHOD OF MAKING A GLASS DIFFUSION CELL

BACKGROUND OF THE INVENTION

1) Field of the Invention

The field of this invention relates to testing equipment and more particularly, to the method of making a diffusion cell which is utilized to determine the transfer of a substance through a membrane into a liquid placed within the diffusion cell.

2) Description of the Prior Art

Percutaneous absorption test cells are used in the study of kinetics of the partition coefficients defining the passage and equilibrium states of components into and through a barrier separating two dissimilar substances. A typical test cell is known as the Franz cell. The Franz cell is in the form of a container with an upper compartment separated from a lower compartment by a porous membrane comprising a barrier. A clamping arrangement is located between the upper compartment and the lower compartment with the barrier in the form of a thin sheet of material to be placed and clamped tightly in a stretched configuration by the clamping arrangement.

The lower compartment of the diffusion cell or Franz cell is completely filled with a receptor media in contact with the barrier. In the upper compartment there is placed a donor substance which may comprise a solid, semi-solid, gas or liquid. The receptor media normally comprises water, a buffer solution or saline solution, but may consist of any polar or non-polar liquid, semi-liquid, or gas with or without surfactants added. Connecting the lower compartment is a sample port and it is through this sample port that aliquots are to be removed. An aliquot is defined as an exact subvolume of the overall volume of the receptor media.

While generally useful in the whole field of physical chemistry, diffusion cells or Franz cells have become particularly useful in the health care field. Levels of epidermal exposure to pesticides, chemicals, ointments and cosmetics are important in the field of environmental science. The rate of release and absorption of ingredients for medicinal skin patches is essential to determine the size, dosage amount and characteristics of the patch.

There has been designed automatic testing equipment in which a given machine will use a plurality of these diffusion cells. The machine will automatically affect the removing of the aliquots and the replacing of the lost fluid within each diffusion cell. The removing of the aliquots is accomplished over time with typical removing occurring sequentially each minute. Each aliquot is then tested to determine the amount of the donor substance that has actually penetrated and becomes dispersed within the receptor media.

It is exceedingly important for accurate results that the volumetric size of the lower compartment of the diffusion cells be constant. Since these diffusion cells are normally constructed individually and are not mass produced, in the past it has been difficult to achieve a high degree of accuracy from one diffusion cell to another.

SUMMARY OF THE INVENTION

The primary objective of the present invention is to produce a method of manufacture for diffusion cells where the diffusion cells can be reproduced with a high degree of volumetric accuracy.

Another objective of the present invention is to produce a method of manufacture of diffusion cells where the diffusion cells can be manufactured at a reasonable cost even though a high degree of volumetric accuracy between different diffusion cells is obtained.

The method of the present invention begins with an inner glass tube that is open ended at each end and is of a prescribed diameter. The inner end of this inner glass tube is mounted within a holding chuck with the outer end of this inner glass tube being heated as the inner glass tube is rotated by the holding chuck. The outer end of this inner glass tube is then placed in contact with a forming tool with there being produced an enlarged annular flange with this enlarged annular flange having an exterior planar surface which is located perpendicular to the longitudinal center axis of the inner glass tube. Then formed within the sidewall of this inner glass tube is a refilling port and a sampling port, with the sampling port being located nearest the enlarged annular flange and the refilling port being located near what will eventually be the bottom of the lower compartment of the glass diffusion cell. An annular glass bead is then formed on the inner glass tube directly adjacent, but slightly spaced from, the enlarged annular flange. An outer glass tube is then placed over the inner glass tube with the upper end of the outer glass tube overlying this annular glass bead and be closely positioned relative thereto. This outer glass tube is then heated in the area of the annular glass bead which causes the outer glass tube to be sealed to the inner glass tube. The exterior planar surface of the enlarged annular flange is then smoothed and etched. The sidewall of the outer glass tube is then penetrated by a refilling tube which connects with the refilling port and by a sampling tube which connects with the sampling port, establishing a fluid conducting connection with the interior chamber of the inner glass tube. The outer glass tube is then connected with an inlet tube and an outlet tube which establishes a fluid connection with the annular space located between the inner glass tube and the outer glass tube. The bottom of the inner glass tube and the outer glass tube are then sealed or closed. The sampling tube is connected at an angular relationship to the longitudinal center axis of the diffusion cell so that the sampling tube crosses the plane of the exterior planar surface of the enlarged annular flange.

BRIEF DESCRIPTION OF THE DRAWINGS

FIG. 5 is a schematic view depicting final forming of this annular bead;

FIG. 6 is a schematic view showing repositioning of the inner glass tube at a different position within a different type of holding chuck and showing usage of connecting with a positioning tool to precisely position the inner glass tube at a set position for the next operation;

FIG. 7 is a schematic view depicting the initiating of the forming of a refilling port within the sidewall of the inner glass tube;

FIG. 8 is a schematic view showing the forming of that refilling port which has connected thereto a section of a thin glass rod;

DETAILED DESCRIPTION OF THE PREFERRED EMBODIMENT

Figure 1:
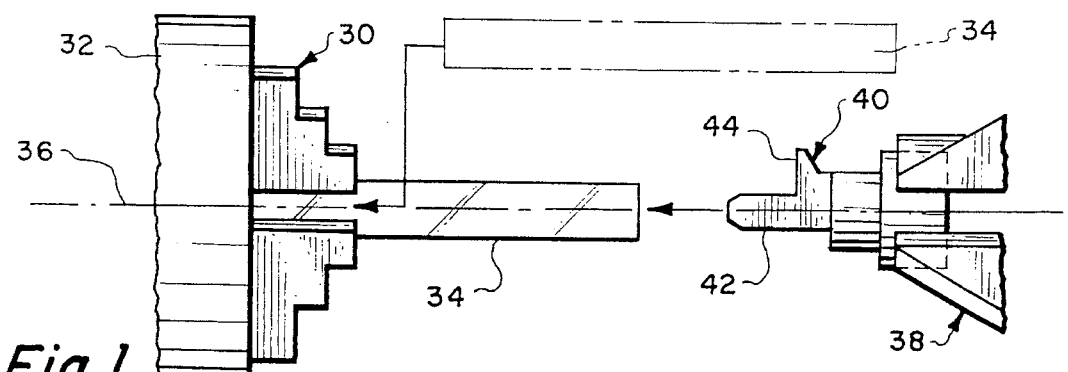
FIG. 1 is a schematic view depicting the utilizing of an open-ended inner glass tube and mounting of that inner glass tube within a chuck with one form of a forming tool being connected to the outer end of the inner glass tube.

Referring particularly to the drawings, there is shown a holding chuck assembly 30 which is mounted on a spindle 32 of a machine (not shown) such as a lathe. The spindle 32 is to be rotatably driven which drives the holding chuck 30. The holding chuck 30 so is accommodate different diameters of parts. The holding chuck 30 is to be snugly placed in contact with the inner end of an inner glass tube 34. Typical diameter for the tube 34 would be ½ to ¾ of an inch. The holding chuck 30 supports the inner glass tube 34 and rotates the inner glass tube 34 about a longitudinal center axis 36. Also rotatably mounted about the longitudinal axis 36 is a second holding chuck 38 which is mounted on another spindle (not shown) which is attached to the machine (not shown).

Figure 2:
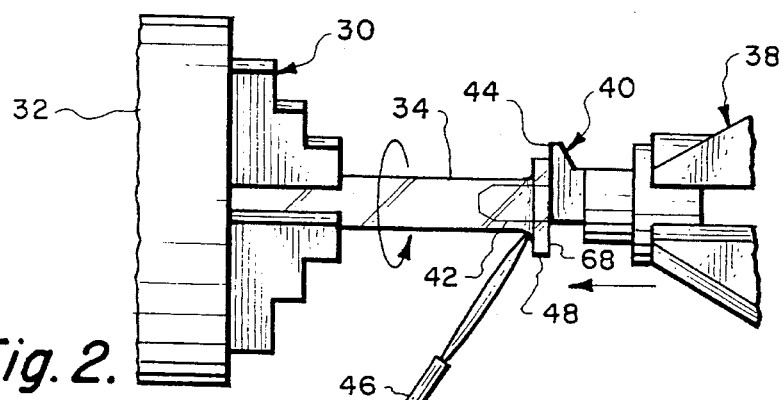
FIG. 2 is a schematic view depicting the heating step and partial forming of the enlarged annular flange at the outer end of the inner glass tube.
Figure 3:
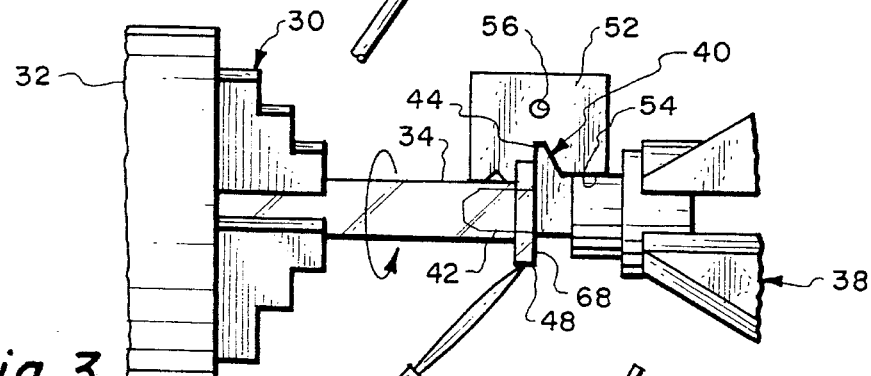
FIG. 3 is a schematic view similar to FIG. 2 further showing complete forming of the enlarged annular flange.

Engaged with the second holding chuck 38 is a forming tool 40. The forming tool 40 has an elongated center member 42 from which extends a transverse flange 44. The forming tool 40 is movable lineally along the longitudinal center axis 36 with this movement being capable of being performed in precise minute amounts. The elongated center member 42 is to be moved within the outer end of the inner glass tube 34 as is clearly shown in FIG. 2 with the transverse flange 44 abutting against the outer end of the inner glass tube 34. This outer end of the inner glass tube 34 is then heated by a torch 46 sufficiently to cause the outer end of the inner glass tube 34 to partially melt so that it can be formed into the enlarged annular flange 48. It is the function of the elongated center member 42 to keep the melted glass in the area of the flange 48 from moving in an inward direction, decreasing the internal chamber 50 of the inner glass tube 34.

The periphery of the enlarged annular flange 48 is formed smooth and flat by a hand-held forming tool 52 which has a flat surface 54 which is used to press against the circumference of the enlarged annular flange 48, thereby forming same during the time that the enlarged annular flange is in the partially melted state. The hand-held forming tool 52 is to have a handle (not shown) which is to be mounted within opening 56 of the forming tool 52. It is to be understood that during this forming operation, and as will be the case with all the forming operations to be described hereinafter, the inner glass tube 34 will be rotated.

Figure 4:
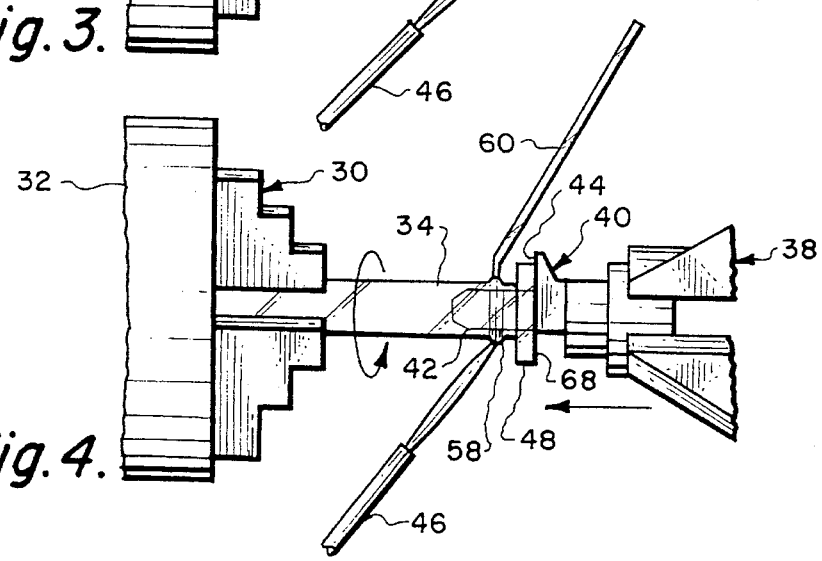
FIG. 4 is a schematic view depicting forming of the annular bead on the inner glass tube located directly adjacent the enlarged annular flange.
Figure 9:
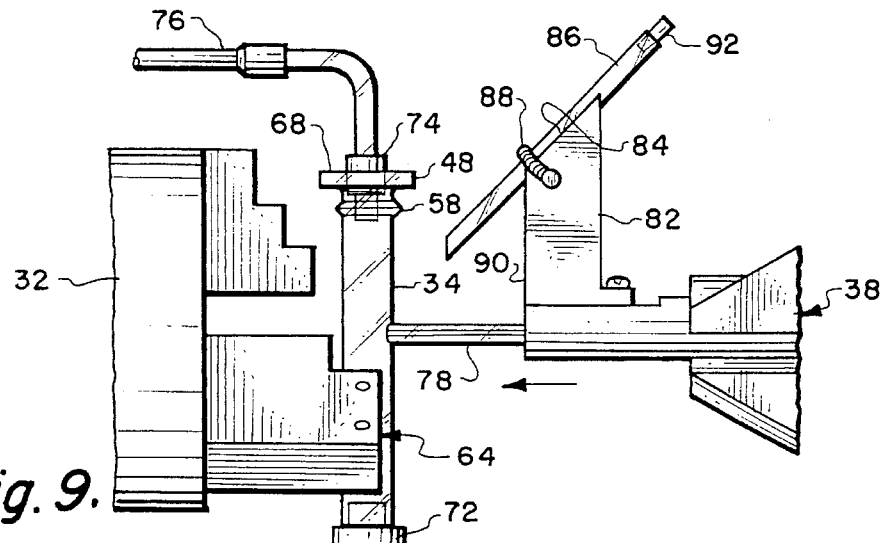
FIG. 9 is a schematic view utilizing the thin glass rod of FIG. 8 as a positioner for the forming of a sampling port on the exterior wall of the inner glass tube with there being a length of glass rod being attached at this sampling port.
Figure 10:
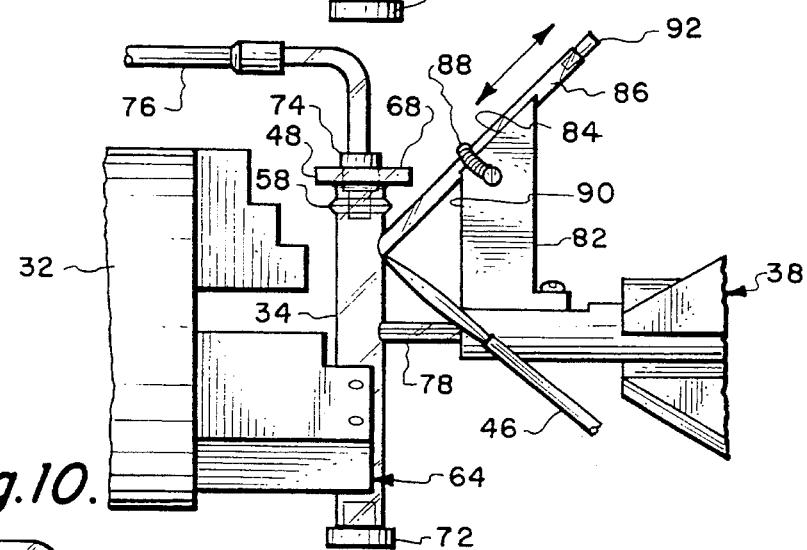
FIG. 10 is a schematic view showing the completion of the securement of the glass rod to the sampling port.

Referring particularly to FIG. 4, it is next desired to fuse a bead of glass around the circumference of the inner glass tube 34. This bead 58 is to be located directly adjacent to the enlarged annular flange 48 but spaced slightly therefrom. This area of the inner glass tube 34 is to be heated and at the same time a thin strip or quantity of glass from a glass rod 60 is to be applied to the inner glass rod 34 forming the bead 58. Final shape of the bead 58 is achieved by indent 62 formed within the hand-held forming tool 52. This indent 62 is to be pressed against the bead 58 as it is being rotated, thereby forming the final shape of the bead 58.

At this particular time, the inner glass tube 34 is now removed from the holding chuck 30 and repositioned on the spindle 32 in conjunction with another type of holding chuck 64. At this particular time the spindle 32 is not rotated, but is held in a fixed position. Prior to installing of the inner glass tube 34 in conjunction with the holding chuck 64 and be snugly held thereby, there is utilized a positioning tool 66 which has a short leg which rests against the exterior planar surface 68 of the enlarged annular flange 48. The positioning tool 66 also includes an elongated leg which fits within an opening 70 formed within the holding chuck 64. When the elongated leg of the positioning tool 66 bottoms out within the opening 70 with the short leg of the positioning tool 66 resting flush against the surface 68, the precise position of the inner glass tube 34 within the chuck 64 is obtained and the chuck 64 is then snugly tightened against the inner glass tube 34 holding such in its desired position.

Now referring to FIG. 7, a plug 72 is placed within the bottom open end of the inner glass tube 34 closing such. Within the open upper end of the inner glass tube 34 which is located directly adjacent the enlarged annular flange, there is inserted a stopper 74. Through the stopper 74 there is conducted a gas tube 76. Through the gas tube 76 is supplied a gas under a small amount of pressure within the inner glass tube 34. Within the holding chuck 38 there is then mounted a glass tube 78. Extending entirely through the glass tube 78 is a wire rod 80. Heat is then applied by the torch 46 to the inner glass tube 34 that is in direct alignment with the wire rod 80. The holding chuck 38 is then moved so that the wire rod will then penetrate through the inner glass tube 34 and when sufficient heat has been applied by the torch 46, the outer end of the glass tube 78 will become fused to the inner glass tube 34. The heat from the torch 46 is then removed with the wire rod 80 now also being removed. It was the function of the wire rod to make sure that the opening between the glass tube 78 and the interior of the inner glass tube 34 is maintained and does not close up. As the melting occurs on the inner glass tube 34, the air pressure that is applied there within will have a tendency to force the melted glass in an outward direction and in contact with the outer end of the glass tube 78.

The holding chuck 38 is then released from the glass tube 78 and a jig 82 is then fixedly mounted within the holding chuck 38. The jig 82 includes a slanted surface 84. Mounted on the slanted surface 84 is a hollow glass rod 86 which is held in place by an elongated spring 88 which is mounted on the jig 82. The hollow glass rod 86 can be slid relative to the jig 82 but when released, will remain in that position. The jig 82 includes a hole (not shown) within which is to be located the glass tube 78. This glass tube 78, which is also hollow, now functions as a positioning device for correct positioning of the jig 82 relative to the inner glass tube 34. This positioning is so that the surface 90 will be located a precise distance from the inner glass tube 34 with this precise distance being premeasured and the jig 82 then so located. The hollow glass rod 86 is then slid on the slanted surface 84 until it comes into contact with the inner glass tube 34. At this time the inner glass tube 34 is then partially melted in this particular area with again air pressure being applied through the gas tube 76. The outer end of the hollow glass tube 86 is closed by a plug 92. The air pressure from the gas tube 76 is then supplied through the hole that is now formed through the inner glass tube 34 into the hollow glass rod 86. The hollow glass rod 86 is then fused to the inner glass tube 34.

The inner glass tube 34 is now removed from the holding chuck 64 and also disengaged from the jig 82. A knife 94 is used to cut the precise desired length of the inner glass tube 34, discarding the remainder 96. A knife 98 is utilized to severe the glass rods 78 and 86, forming respectively nipples 100 and 102. The glass rods 78 and 86 are then discarded or put aside for future use.

Figure 12:
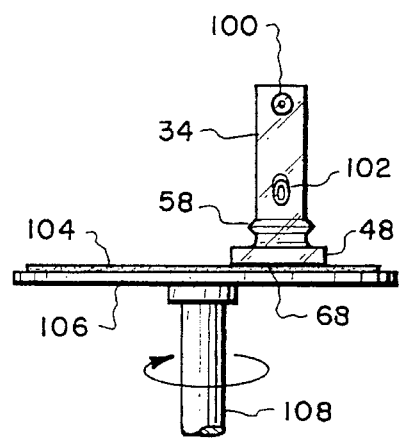
FIG. 12 is a schematic view depicting smoothing and etching of the exterior planar surface of the enlarged annular flange.

Referring in particular to FIG. 12, the exterior planar surface 68 is then placed in contact with a grinding pad 104 of a grinding wheel 106, The grinding wheel 106 is rotatably driven by a motor (not shown) which connects to a shaft 108. The purpose of the grinding pad 104 is to etch and smooth the exterior planar surface 68. On this surface 68 there will ultimately be located a membrane such as a segment of human skin. There will also be associated an upper compartment (not shown) which will be clamped onto the enlarged annular flange 48, binding this skin in a tight manner across the opening into the internal chamber 50. On this membrane there is to be located a quantity of an ointment or other type of substance. A liquid, such as a saline solution, is to completely fill the internal chamber 50 and be in contact with that membrane.

Figure 13:
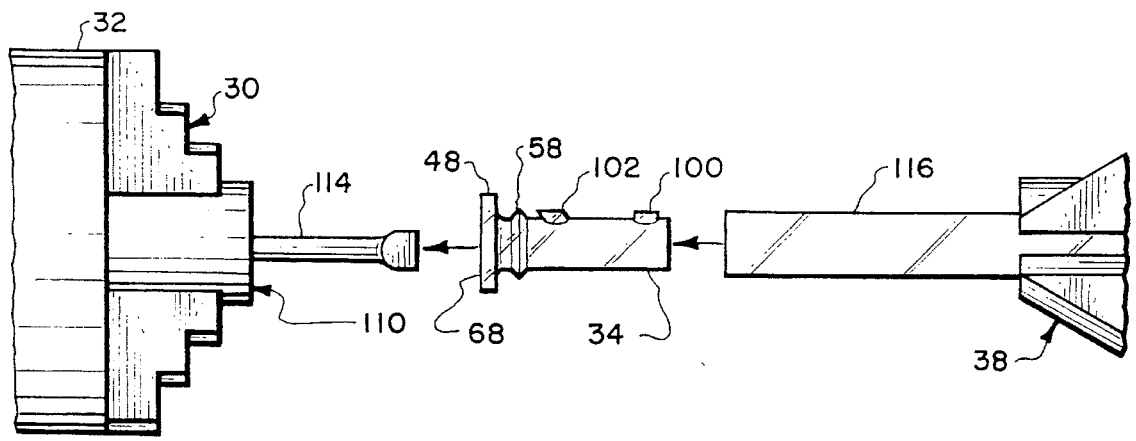
FIG. 13 is a schematic view showing the initial mounting of the inner glass rod in conjunction with an outer glass rod.
Figure 14:
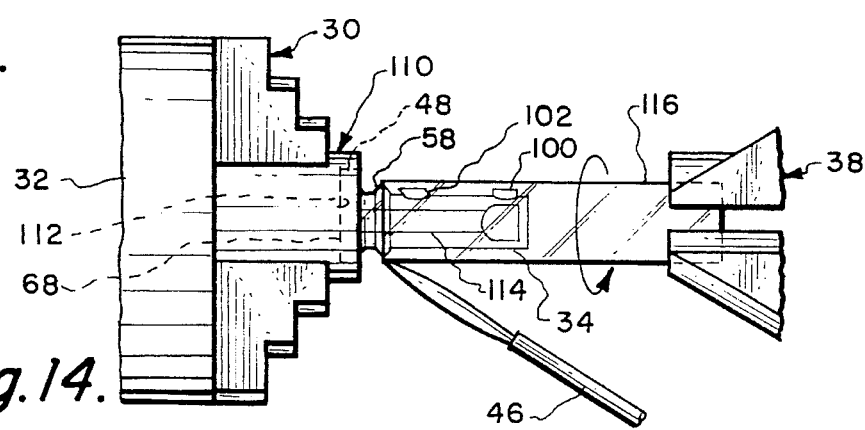
FIG. 14 is a schematic view depicting the sealing of the upper end of the outer glass rod to the annular bead formed on the inner glass rod.
Figure 15:
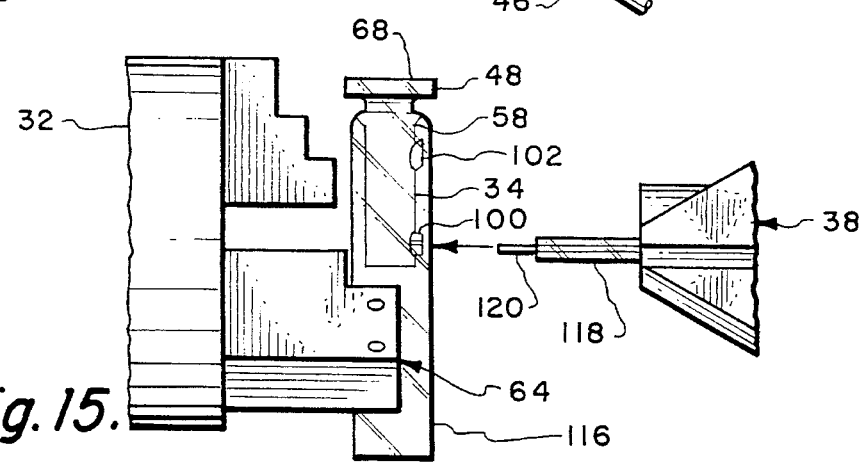
FIG. 15 is a schematic view showing the now connected together inner glass tube and outer glass tube being mounted in a different position depicting initial positioning of the refilling glass tube in conjunction with the outer glass tube.

Referring in particular to FIGS. 13 and 14 of the drawings, the holding chuck 30 is now employed which is used to snugly retain a vacuum support 110. The vacuum support 110 includes a recess 112 within which the enlarged annular flange 48 is to be snugly located. A vacuum is to be applied from a source (not shown) to the recess 112. It is the function of the vacuum to securely hold in position the enlarged annular flange 48 relative to the vacuum support 110. The vacuum support 110 also includes a support rod 114 which is to extend within the internal chamber 50 and serve to hold the inner glass tube 34 in position.

At this time an outer glass tube 116 is then placed about the inner glass tube 34 with the internal diameter of the outer glass tube 116 being just about equal to the exterior diameter of the glass bead 58. This outer glass tube 116 is mounted within the holding chuck 38. With an end of the outer glass tube 116 being located directly in alignment with the glass bead 58, both the inner glass tube 34 and the outer glass tube 116 are simultaneously rotated at the same velocity. Heat is applied by the torch 46 to the outer glass tube 116 directly adjacent the bead 58, causing a fusing to occur therebetween.

Figure 11:
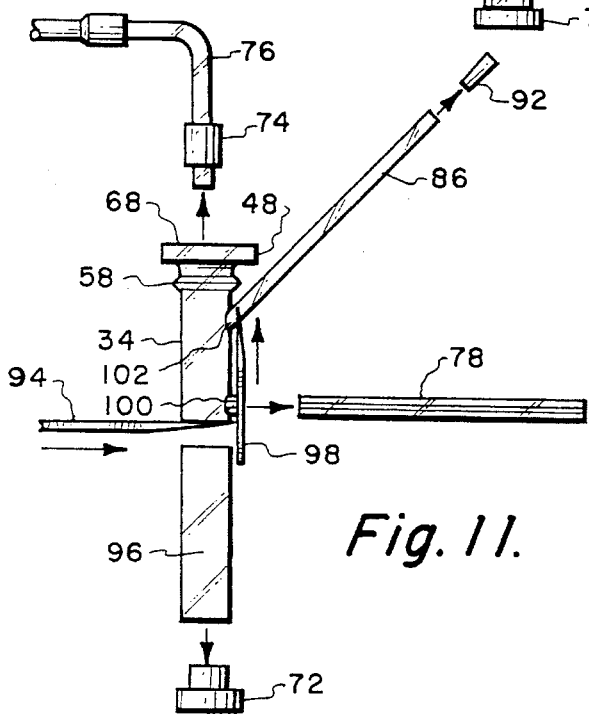
FIG. 11 is a schematic view depicting removal of the glass rods at the refilling port and the sampling port leaving only the ports.
Figure 23:
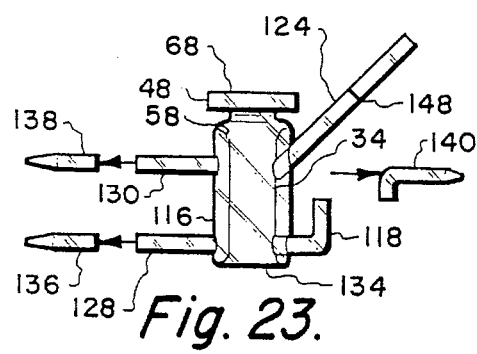
FIG. 23 is a side view of this portion of the diffusion cell depicting final removal of excess portions of the refilling tube, inlet tube and outlet tube.
Figure 24:
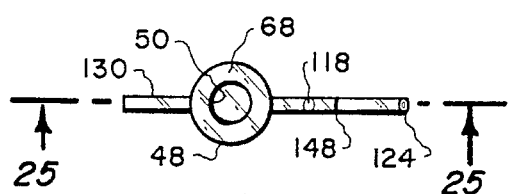
FIG. 24 is a top view of the lower compartment of the diffusion cell shown in FIG. 23.

At this particular time the combined structure of the inner glass tube 34 and the outer glass tube 116 is removed from the vacuum support 110 and the holding chuck 38 and is then placed within an oven at about one thousand degrees Fahrenheit for a short period of time in order to anneal the produced structure and prevent premature cracking. Sensitive annealing is to occur between FIGS. 11 and 12, between FIGS. 17 and 18, and after FIG. 23.

Figure 16:
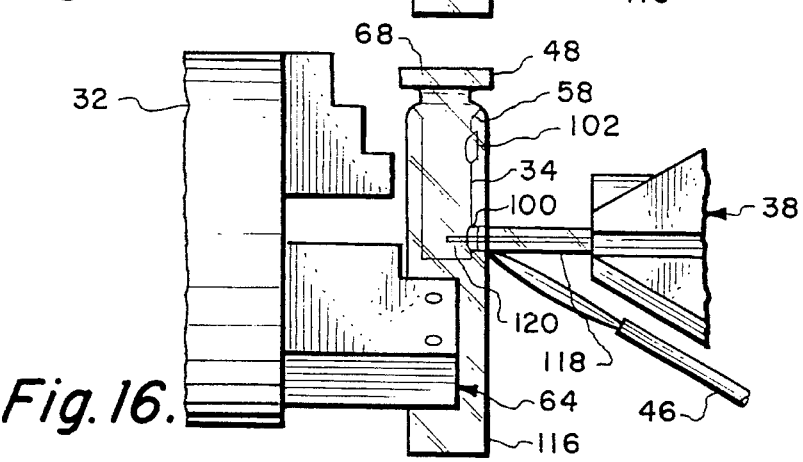
FIG. 16 is a schematic view depicting the installation of the refilling tube with the refilling port and establishing a seal between the refilling tube and the outer glass tube.

After removal from the oven (not shown), the outer glass tube 116, which contains the inner glass tube 34, is then supported by the holding chuck 64. The nipple 100 is located is an outwardly facing direction and a hollow glass rod 118 is then supported within the second holding chuck 38. In a similar manner as it was previously described, a wire rod 120 is placed within the hollow glass rod 118. Heat is applied by the torch 46 to the outer glass tube 116 in the area of contact by the rod 120. The rod 120 will then penetrate the outer glass tube 116 and extend within the opening provided within the nipple 100. Further heating will result in the fusing of the hollow glass tube 118 to the outer glass tube 116. This fusing is shown in FIG. 16. The wire rod 120 is then removed, as well as the second holding chuck 38.

Figure 17:
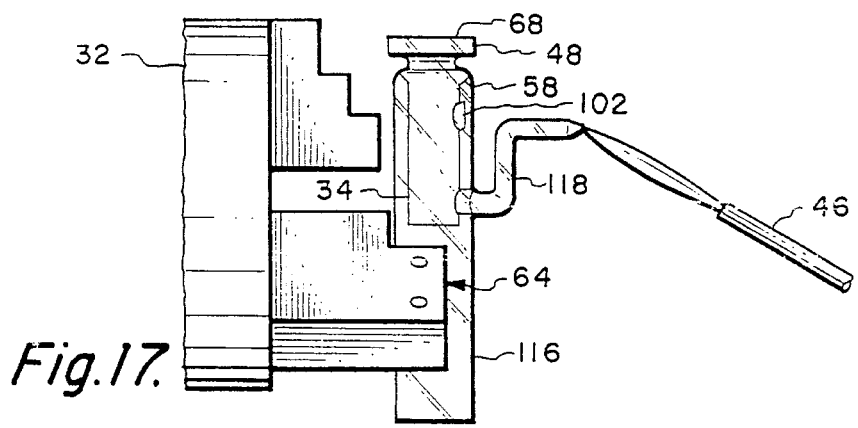
FIG. 17 is a schematic view similar to FIG. 16 but showing the forming of the shape of the refilling tube.
Figure 18:
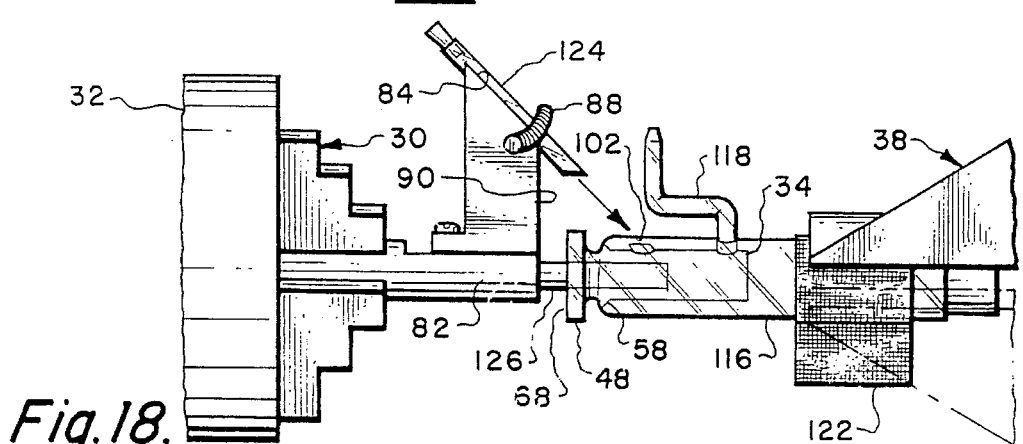
FIG. 18 is a schematic view showing a repositioning of the inner and outer glass tubes depicting the initial connection of the sampling tube with the sampling port.
Figure 19:
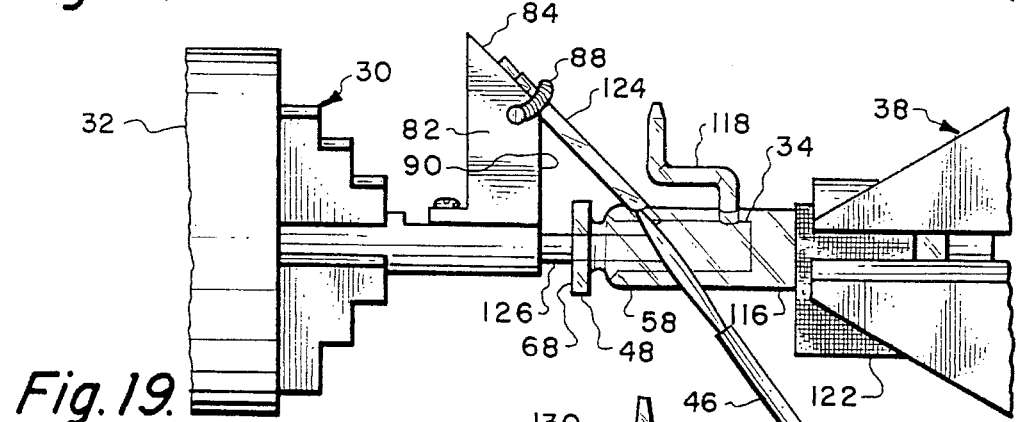
FIG. 19 is a schematic view similar to FIG. 18 but showing the actual connection of the sampling tube with the sampling port with a sealing occurring between the cylindrical wall of the outer glass tube and the sampling tube.

At this particular time, heat is applied by the torch 46 to the hollow glass rod 118 to deform such into a Z shape as shown in FIG. 17. The holding chuck 64 is then released with the outer glass tube 116 being supported is shown in FIG. 18 within the holding chuck 38. An insulative pad 122 is located between the jaws of the holding chuck 38 and the outer glass tube 116 preventing transfer of heat from the outer glass tube 116 to the holding chuck 38. Jig 82 is then reused with another hollow glass rod 124 being mounted on the slanted surface 84 and is held in place by the spring 88. This jig 82 is mounted within the holding chuck 30. Included within the jig 82 is a support rod 126 which extends within the internal chamber 50 past the enlarged annular flange 48 and functions to support the now combined structure of the inner glass tube 34 and the outer glass tube 116. The exterior planar surface 68 is then oriented a precise distance from the surface 90 of the jig 82. When this distance is established and the angular position of the outer glass tube 116 is such that the nipple 102 is located at the twelve o'clock position, heating of the outer glass tube 46 directly adjacent to nipple 102 is caused to occur as the glass rod 124 is moved in contact with the outer glass tube 116 puncturing the outer glass tube 116 and fusing to the nipple 102.

Figure 20:
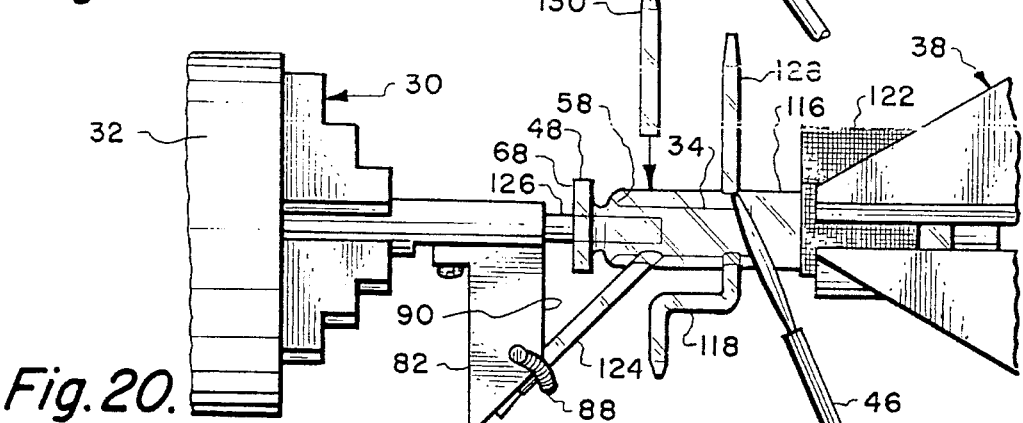
FIG. 20 is a schematic view depicting the installation of inlet and outlet tubes in conjunction with the sidewall of the outer glass tube which establishes a fluid connection to the annular chamber located between the inner glass tube and the outer glass tube.

Referring now to FIG. 20 of the drawings, an inlet tube 128 and an outlet tube 130 are then fused to the wall of the outer glass tube 116.

Figure 21:
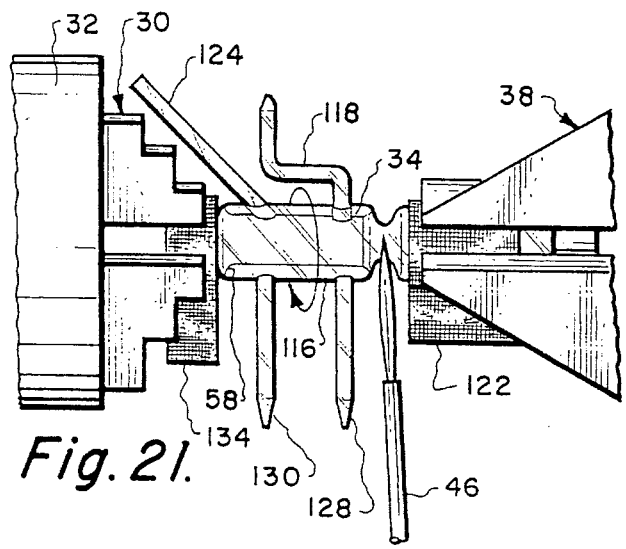
FIG. 21 is a schematic view depicting the forming of a closed bottom of the inner glass tube and the outer glass tube.
Figure 22:
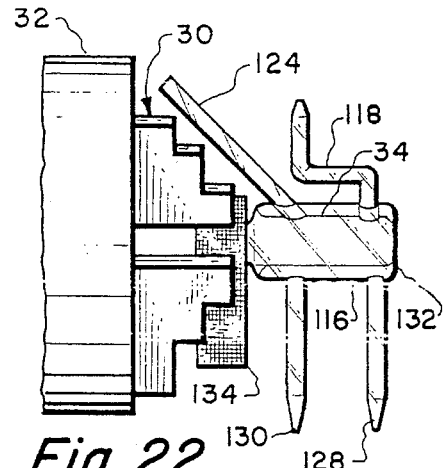
FIG. 22 is a schematic view showing the almost completed lower compartment of the diffusion cell still mounted within a holding chuck.

Referring now to FIG. 21 of the drawings, the outer glass tube 116 is heated by torch 46 directly adjacent the bottom end of the inner glass tube 34. This produces the flush bottom 132. The inner end of the inner glass tube 34 is now fused to the outer glass tube 116 in the forming of the bottom 132. During this forming of the bottom 132, the enlarged annular flange 48 is supported by an insulative pad 134 within the holding chuck 130.

Figure 25:
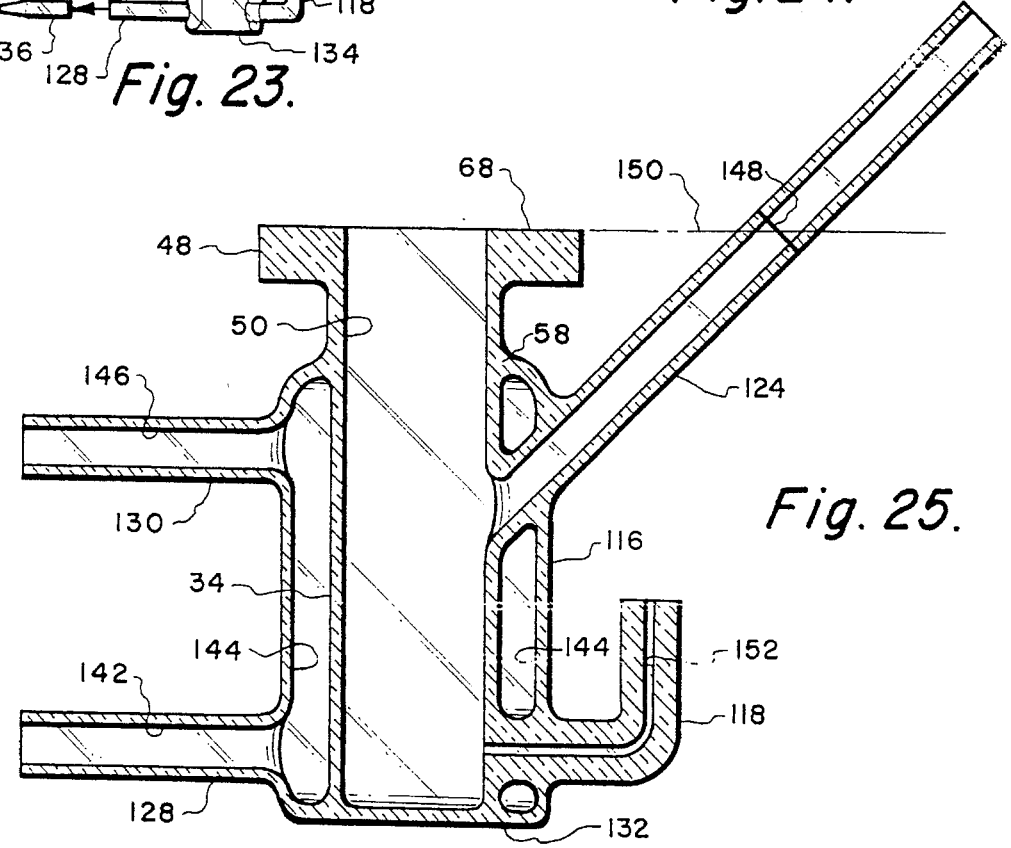
FIG. 25 is a cross-sectional view through the completed lower compartment of the diffusion cell taken along line 25—25 of FIG. 24.

The resulting diffusion cell that is produced by the method of this invention is then removed from the holding chuck 30 with unwanted sections 136 and 138 respectively of the outlet tube 128 and inlet tube 130 and the unwanted section 140 of the glass rod 118 are then discarded. The result is, as shown in FIG. 25, a lower compartment of the diffusion cell which has an inlet passage 142 which connects with annular chamber 144 located interiorly of the outer glass tube 116. A cooling liquid is to be supplied through the passage 142 into the annular chamber 144 and then be discharged through the outlet passage 146 formed within the outlet tube 130. Normally this cooling liquid will be applied on a continuous basis when using of the diffusion cell. There is inscribed on the surface of the glass rod 124 a mark 148 with the point where this mark traverses the center axis of the glass rod 124 coinciding with the plane 150 of the exterior planar surface 68. The reason for the mark 148 is so that at all times filling liquid is to be supplied through passage 152 of the hollow glass rod 118 into the internal chamber 50 to fill such so that the level of the liquid within the internal chamber 50 will be flush with the exterior planar surface 68. If the level of the liquid within glass rod 124 falls below the mark 148, it is known that additional liquid is to be supplied through the passage 152. There will be periodically removed by means of the glass rod 124 aliquots of the liquid for testing purposes.

What is claimed is:

1. A method of making a component of a glass diffusion cell comprising:

mounting the inner end of an inner glass tube in a holding chuck with the inner glass tube having a first cylindrical sidewall;

placing a forming tool in contact with the outer end of said inner glass tube;

heating of the outer end sufficiently to cause partial melting of the outer end and forming of an enlarged annular flange at said outer end with said enlarged annular flange having an exterior planar surface which is located perpendicular to the longitudinal center axis of said inner glass tube;

forming an annular glass bead on said inner glass tube directly adjacent but slightly spaced from said enlarged annular flange;

forming in the sidewall a refilling port and a sampling port with the sampling port being located nearest said enlarged annular flange;

placing said inner glass tube within an outer glass tube with said enlarged annular flange being located exteriorly of said outer glass tube and with there being an annular chamber located between said inner glass tube and said outer glass tube, said outer tube having an upper end and a bottom end connected together by a cylindrical sidewall;

sealing the upper end of said outer glass tube to said inner glass tube with said sealing occurring at said glass bead;

penetrating said second cylindrical sidewall with a refilling tube and connecting said refilling tube with said refilling port where said refilling tube fluidly connects only with the interior of said inner glass tube and not with said annular chamber;

sealing said second cylindrical wall with said refilling tube;

penetrating said second cylindrical sidewall with a sampling tube and connecting said sampling tube with said sampling port where said sampling tube fluidly connects only with the interior of said inner glass tube and not with said annular chamber;

sealing said second cylindrical wall with said sampling tube;

penetrating said second cylindrical sidewall with an inlet tube and an outlet tube that fluidly connect with said annular chamber; and sealing said bottom end of said outer glass tube and said inner end of said inner glass tube preventing direct fluid interconnection therebetween.

2. The method as defined in claim 1 wherein:

each said sealing step is accomplished by heating and partial melting of either said inner glass tube or said outer glass tube, or both.

3. The method as defined in claim 1 wherein after the heating step there is included the additional step of:

smoothing and etching said exterior planar surface.

4. The method as defined in claim 1 further including the step of:

locating said sampling tube at an inclined angle relative to the longitudinal center axis of said inner glass tube where said sampling tube crosses the plane of said exterior planar surface of said enlarged annular flange.

5. The method as defined in claim 1 wherein said second penetrating step includes:

precisely positioning said sampling tube a predetermined distance from said exterior planar surface.

\* \* \* \* \*